United States Patent [19]

Schneider

[11] 4,199,191
[45] Apr. 22, 1980

[54] HEADREST FOR SEAT OF VEHICLE

[76] Inventor: Jean C. Schneider, Plaisance 2, 2300 La Chaux-de-Fonds, Switzerland

[21] Appl. No.: 914,929

[22] Filed: Jun. 12, 1978

Related U.S. Application Data

[63] Continuation-in-part of Ser. No. 864,827, Dec. 27, 1977, Pat. No. 4,141,589, which is a continuation of Ser. No. 708,864, Jul. 26, 1976, abandoned.

[30] Foreign Application Priority Data

Aug. 12, 1975 [CH] Switzerland ...................... 10566/75
Jan. 24, 1976 [CH] Switzerland ........................... 872/76

[51] Int. Cl.$^2$ ............................ A47C 1/10; A47C 7/38
[52] U.S. Cl. .................................... 297/397; 297/216; 297/396
[58] Field of Search ............... 297/216, 390, 391, 397, 297/404; 280/749

[56] References Cited

U.S. PATENT DOCUMENTS

| 2,757,040 | 7/1956 | McLelland | 280/749 X |
| 3,645,556 | 2/1972 | Kobori | 280/749 |
| 3,865,450 | 2/1975 | Bruenig | 297/397 |

FOREIGN PATENT DOCUMENTS

| 1958060 | 5/1971 | Fed. Rep. of Germany | 297/396 |
| 2201537 | 7/1973 | Fed. Rep. of Germany | 297/396 |
| 2206094 | 8/1973 | Fed. Rep. of Germany | 297/396 |

*Primary Examiner*—James C. Mitchell
*Attorney, Agent, or Firm*—Miller & Prestia

[57] ABSTRACT

A seat headrest for a vehicle includes a reinforcement means in communication with an energy shock absorbing means. The reinforcement means include a plurality of rectangular hollow segments. The segments of the reinforcement means cooperate with the energy absorbing means in the absorption of shock to the headrest.

17 Claims, 2 Drawing Figures

HEADREST FOR SEAT OF VEHICLE

BACKGROUND OF THE INVENTION

This is a continuation-in-part of application Ser. No. 864,827, filed Dec. 27, 1977, now U.S. Pat. No. 4,141,589, which is itself a continuation of application Ser. No. 708,864 filed July 26, 1976 now abandoned.

In vehicles and particularly in passenger cars, headrests are necessary to protect the passengers seated on the front seats against injuries of the spine or the neck which are frequent consequences of car accidents.

Different types of headrests exists for seats of vehicles and particularly for cars. Nevertheless, these headrests usually are large in size and consequently reduce the view inside of the vehicle, and the view from the inside to the outside of the vehicle. Other headrests which are smaller in size need to be adjusted to fit passengers of different heights. There are also headrests which have openings in their center in order to increase visibility, however, they often do not meet this goal.

Apart from these well-known headrest, as described above, there are others which have nets stretched over a rigid frame, described in the U.S. Pat. No. 3,645,556 and in the published German Patent Applications DT-OS No. 2,042,069 and 2,206,094. Nevertheless, this kind of headrest is not very aesthetic and does not meet many safety requirements imposed by the appropriate authorities. Furthermore, they also reduce the visibility inside the vehicle and the visibility from the inside to the outside of the vehicle. Other types of safety installations, as described, for instance, in the French Pat. No. 2,065,395 and the published German Patent Application DT-OS No. 2,056,801 serve as headrests, and are mainly made of transparent material. These devices nevertheless present the problem of having to be fixed between the back of either the front seat or the back seat and the top of the vehicle, which requires a special construction of the car body, thus, making them uneconomical.

One of the objects of the present invention is to provide a headrest which can be made of the appropriate dimensions assuring a good and comfortable fit to the passenger, whatever his height, without the need for adjustments even if he is not perfectly centered on the seat. Furthermore, the headrest of the present invention only slightly reduces the visibility inside the vehicle and the visibility from the inside to the outside of the vehicle, for the driver as well as the other passengers. Another very important object of the present invention is that the headrest provides increased shock absorbance over the prior art headrests and further meets the safety requirements provided by the national authorities.

According to the invention these and other objects are met by a headrest which comprises a frame having a structure for absorbing energy in case of a collision between the head and the headrest. The headrest unit includes a reinforcement means surrounding the frame with a transparent and elastic foil which is attached to the reinforcement means assuring the fixation of the foil onto the frame.

An advantageous embodiment of the invention is characterized in the reinforcement means being formed by segments, the walls of which are nearly the same thickness as the foil.

SUMMARY OF INVENTION

A vehicle seat headrest unit of the type having a frame with a pair of spaced leg portions adapted for attachment to the vehicle seat and having an energy absorbing means spanning the frame for absorbing energy directed to the headrest unit, further includes a reinforcement means. The reinforcement means surrounds the frame connecting the energy absorbing means to the frame. The reinforcement means includes a plurality of rectangular hollow segments, each of which has a thickness sufficient to absorb shocks in the area of the frame. The segments of the reinforcement means cooperates with the energy absorbing means in the absorption of a shock to the headrest unit.

DETAILED DESCRIPTION OF THE INVENTION

Figure 1:
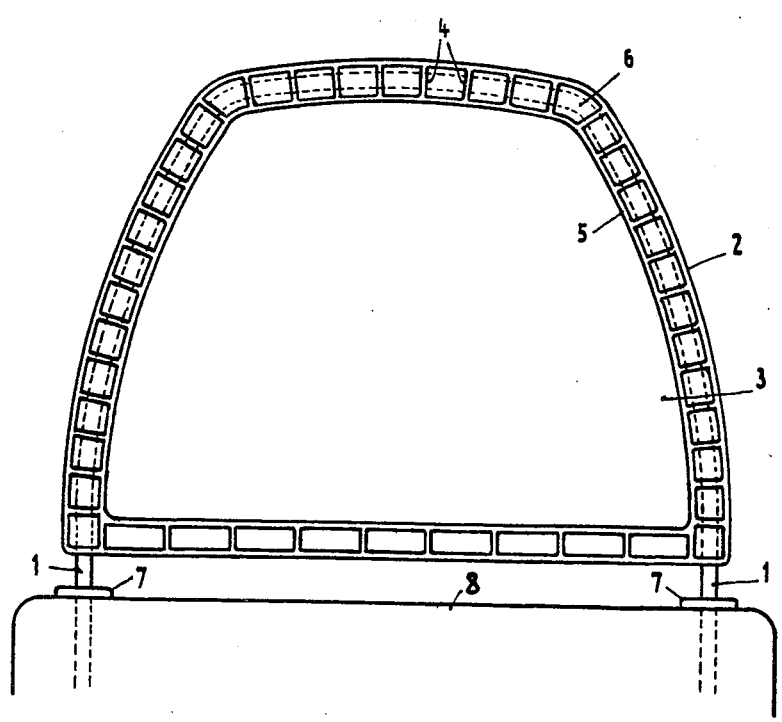
FIG. 1 is a rear view of an embodiment of the present invention.
Figure 2:
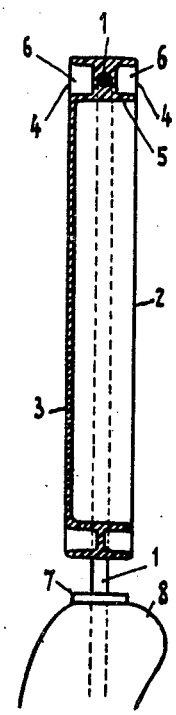
FIG. 2 is a cross sectional view of the embodiment of the present invention according to FIG. 1 along its middle axis.

Referring to FIGS. 1 and 2, the headrest according to the present invention is designated as 2. The headrest 2 includes a frame 1, typically of a metal and of circular cross section. The frame 1 serves as a support for an energy absorbing means 3, for example, a foil of a transparent and elastic injection molded synthetic material of a soft PVC type. The frame 1 is typically of a steel bar adequately bent so that its ends fit into openings of a conventional headrest mounting 7 which is secured to the vehicle seat 8. The foil 3 serves as a rest for the head and as a shock absorber in case of a shock to the head. Surrounding the frame 1 is a reinforcement means 4. The reinforcement means 4 serves to hold and support the foil 3 along its outer perimeter to the frame 1.

The reinforcement means 4 includes a plurality of segments 6 which have walls 5 having a thickness approximately equal to that of the foil 3 and is typically also of injection moldable material having a sufficient flexibility and rigidity to assist the foil 3 in absorbing shocks thereto.

The invention, as described, allows for the manufacture of the headrest 2, wherein with one step of injection molding both the reinforcement means and the shock absorbing means are formed, both of the same material.

Again referring to FIGS. 1 and 2, the segments of the reinforcement means 4, are typically hollow and rectangular in shape. Furthermore, as is most evident from FIG. 2, because the foil 3 is directly attached to a wall 5 of the reinforcement means 4, the foil 3 and wall 5 of the segments will cooperate together in the absorbtion of a shock to the headrest 2, and in particular a shock to the foil 3. That is to say, a shock that is subjected to the foil 3 will in turn apply a force to the walls 5 which will in turn be deflected somewhat and thereupon cooperate in absorbing the shock along with foil 3. It should be noted that wall 5 is a common wall of the segments 6 and particularly the inside wall of the reinforcement means 4. However, the present invention can be adapted so that the foil 3 is attached instead to the common outside wall of the segments 6, which will also cooperate with the foil 3 in absorbing shock.

The headrest 2 according to the invention is placed so that it extends from the top of seat 8 a distance sufficient to accommodate drivers and passengers having different heights. Thus, the headrest 2 provides head support and shock absorbance to all without having to adjust its position.

The present invention as described above is by way of example since other modifications and variations of the present invention are anticipated without departing from the scope and spirit of the present invention. Some of the anticipated modifications are as follows:

While the reinforcement means is described as being of the same material as the foil 3, it is anticipated that the reinforcement means 4 can be of a material different from that of the foil 3 and made in a separate production step.

The metallic frame 1 can be replaced by a frame made of synthetic material of high mechnical resistance, for example, a synthetic material with glass-fibers.

The foil 3, which has been shown in FIGS. 1 and 2 as being flat, can be curved to adapt itself better to the form of the back of the vehicle seat 8. Furthermore, it is anticipated by the present invention, that since the lower part of the reinforcement means 4 in the embodiment of the invention as described does not include a metallic member, the passenger can easily adapt the foil's form to the form of the back of the seat 8 by slightly pushing against it with his back.

The frame 1 can, in another embodiment, comprise extremities which are bent to fit directly into holes in the back of the seat 8 provided for this purpose, without the need for a mounting 7. It can also be fixed to other conventional fixation elements having no holes.

In another embodiment of the invention, the foil 3 and the reinforcement means 4, which totally surrounds the frame 1, are replaced by a cover, made for instance of a transparent soft PVC material. The cover is fitted or slipped over the frame 1 and serves principally as the shock absorbing part of the headrest. The cover is of one piece construction and is identical to the invention as described in FIGS. 1 and 2, except that the outer perimeter of the cover, i.e. the portion that replaces the reinforcement means 4, has a slit or opening down the center of its equivalent to the wall 5 of FIGS. 1 and 2, so that the cover can slip over and onto the frame 1. Thus, the cover will cover the front, back and outerside of the frame 1, but not the inner side. It is further anticipated that the cover can be fixed to the frame 1 by some tape or by soldering or merely by friction.

The headrest of the present invention provides increased shock absorbance by having the reinforcement means cooperate with the foil in the absorbing of a shock to the headrest.

I claim:

1. In a vehicle seat headrest unit of the type having a frame with a pair of spaced leg portions adapted for attachment to the seat and energy absorbing means spanning the frame for absorbing energy, the improvement comprising reinforcement means surrounding the frame and connecting said energy absorbing means to the frame, said reinforcement means having a plurality of segments, and said segments cooperating with said energy absorbing means in the absorbtion of a shock to said headrest unit.

2. The headrest according to claim 1, wherein said segments are hollow and rectangular in shape.

3. The headrest according to claim 2, wherein said segments have a wall in communication with and for supporting said energy absorbing means, said wall adapted to flex when a shock is imparted to said energy absorbing means thereby cooperating with said means in absorbing said shock.

4. The headrest according to claim 1, wherein said energy absorbing means is the same thickness as said reinforcement means.

5. The headrest according to claim 1, wherein said energy absorbing means is a foil.

6. The headrest according to claim 1, in which the energy absorbing means is placed at a distance from the top of the back of the seat so as to permit passengers of the vehicle, independent of their height, to rest their heads on the headrest without having to adjust it.

7. The headrest according to claim 1, in which the energy absorbing means and the reinforcement means are made of one piece of transparent and elastic material.

8. The headrest according to claim 1, in which the frame is exclusively formed out of elements with rounded sections so as to prevent said energy absorbing means and said reinforcement means from being torn or the passengers from being hurt.

9. The headrest according to claim 1, in which the frame is formed of a round bar of steel, bent in order to permit its fixation onto the seat.

10. The headrest according to claim 1, in which the frame is made of a hard injection moldable synthetic material having a high mechanical resistance.

11. A headrest for vehicle seats comprising:
   (a) a frame having a pair of spaced-apart leg portions
   (b) a reinforcement means surrounding said frame and having a plurality of rectangular, hollow segments, and
   (c) an energy absorbing means attached to a common wall of said segments, said wall of said segments beng adapted to flex when a shock is imparted to said energy absorbing means.

12. The headrest in accordance with claim 11, wherein said common wall is the inner wall of said segments.

13. The headrest in accordance with claim 11, wherein said common wall is the outer wall of said segments.

14. The headrest according to claim 11, wherein said energy absorbing means is a foil.

15. The headrest according to claim 11, in which the energy absorbing means and the reinforcement means are made of one piece of transparent and elastic material.

16. The headrest according to claim 11, in which the frame is exclusively formed out of elements with rounded sections so as to prevent said energy absorbing means and said reinforcement means from being torn or the passengers from being hurt.

17. A headrest for vehicle seats comprising:
   (a) a frame having a pair of spaced-apart leg portions,
   (b) a reinforcement means surrounding said frame and having a plurality of hollow segments, each of said segments having upper members and lower members, said upper members comprising the outside periphery of said reinforcement means and said lower members comprising the inside periphery of said reinforcement means as it surrounds said frame,
   (c) an energy absorbing means attached to said lower members of said segments, said lower members adapted to flex when a shock is imparted to said energy absorbing means.

* * * * *